US008274044B2

(12) United States Patent
Yoshioka et al.

(10) Patent No.: US 8,274,044 B2
(45) Date of Patent: Sep. 25, 2012

(54) MASS SPECTROSCOPE AND MASS SPECTROMETRY

(75) Inventors: Shinji Yoshioka, Hitachinaka (JP); Akihiro Takeda, Hitachinaka (JP); Tsukasa Shishika, Mito (JP)

(73) Assignee: Hitachi High-Technologies Corporation, Tokyo (JP)

( * ) Notice: Subject to any disclaimer, the term of this patent is extended or adjusted under 35 U.S.C. 154(b) by 77 days.

(21) Appl. No.: 13/055,382

(22) PCT Filed: Jun. 18, 2009

(86) PCT No.: PCT/JP2009/061551

§ 371 (c)(1), (2), (4) Date: Jan. 21, 2011

(87) PCT Pub. No.: WO2010/010780

PCT Pub. Date: Jan. 28, 2010

(65) Prior Publication Data

US 2011/0121174 A1 May 26, 2011

(30) Foreign Application Priority Data

Jul. 25, 2008 (JP) ................................ 2008-191580

(51) Int. Cl.
*H01J 49/40* (2006.01)
*B01D 59/44* (2006.01)

(52) U.S. Cl. ......... 250/283; 250/287; 250/282; 250/281

(58) Field of Classification Search .......... 250/281–283, 250/287, 294–295
See application file for complete search history.

(56) References Cited

U.S. PATENT DOCUMENTS

| | | | | |
|---|---|---|---|---|
| 4,736,101 | A | 4/1988 | Syka et al. | |
| 2005/0063864 | A1 | 3/2005 | Sano et al. | |
| 2006/0169892 | A1 * | 8/2006 | Baba et al. | 250/292 |
| 2008/0048109 | A1 * | 2/2008 | Schwartz et al. | 250/282 |
| 2011/0114835 | A1 * | 5/2011 | Chen et al. | 250/282 |

FOREIGN PATENT DOCUMENTS

| | | |
|---|---|---|
| JP | 2005-091344 | 4/2005 |
| JP | 2006-185781 | 7/2006 |
| JP | 2006-234782 | 9/2006 |
| JP | 2006-351532 | 12/2006 |
| JP | 2008-096353 | 4/2008 |

* cited by examiner

*Primary Examiner* — Jack Berman
*Assistant Examiner* — David E Smith
(74) *Attorney, Agent, or Firm* — McDermott Will & Emery LLP

(57) ABSTRACT

Provided is a mass spectroscope employing electron capture dissociation wherein the peak number of detectable fragment ions is increased. The mass spectroscope comprises an ion source (2) for generating ions from a sample, an ion trap (3) for storing and selecting ions, an ion dissociation section (4) performing electron capture dissociation on ions, and a time-of-flight mass spectrometry section (7) performing mass spectrometry on ions, wherein the reaction time of electron capture dissociation is variable depending on the valence of ions subjected to mass spectrometry.

8 Claims, 8 Drawing Sheets

FIG. 8

C SERIES

| | |
|---|---|
| 3 ms FRAGMENT ION TOTAL | 9002.89 |
| 5 ms FRAGMENT ION TOTAL | 9168.74 |
| 10 ms FRAGMENT ION TOTAL | 1595.81 |

Z SERIES

| | |
|---|---|
| 3 ms FRAGMENT ION TOTAL | 15336.42 |
| 5 ms FRAGMENT ION TOTAL | 17743.51 |
| 10 ms FRAGMENT ION TOTAL | 5848.71 |

MASS SPECTROSCOPE AND MASS SPECTROMETRY

RELATED APPLICATIONS

This application is the U.S. National Phase under 35 U.S.C. §371 of International Application No. PCT/JP2009/061551, filed on Jun. 18, 2009, which in turn claims the benefit of Japanese Application No. 2008-191580, filed on Jul. 25, 2008, the disclosures of which Applications are incorporated by reference herein.

TECHNICAL FIELD

The present invention relates to a mass spectrometer performing electron capture dissociation (ECD) and mass spectrometry using the mass spectrometer.

BACKGROUND ART

In recent years, function/structure analysis of protein produced using genetic information or biopolymer peptide post-translationally modified and functioning in cells based on the protein has attracted attention.

Mass spectrometry has been attracting attention as means for such function/structure analysis. By use of the mass spectrometry, it is possible to obtain sequence information of protein or a peptide component as a biopolymer component in which amino acids are linked by peptide bond. Particularly in a mass spectrometer with an ion trap using a high frequency electric field, MSn measurement can be performed in an ion trap section, as disclosed in Patent Literature 1.

A sample is ionized in an ionization section, and then introduced and accumulated in the ion trap section. Next, parent ions are isolated by use of FNF (Filtered Noise Field). Next, CID (Collusion Induced Dissociation) is set up, and dissociated ions are detected by an ion detection section to obtain MSn spectra. Such an ion trap or TOF (Time Of Flight) type mass spectrometry, which can achieve high-speed analysis, has high compatibility to a sample separating method such as liquid chromatography. Accordingly, the ion trap or TOF type mass spectrometry has been used widely in analyses such as proteome analysis where continuous analysis of a sample is regarded as important.

Currently, the aforementioned CID is the most widely used method in the field of protein/peptide analysis. When a peptide consisting of amino acids is dissociated using this method, the peptide is preferentially dissociated in portions attributed to a-x and b-y. However, some amino acid sequence has a portion which may be difficult to dissociate. In addition, when ion dissociation is performed by CID, a post-translationally modified peptide or the like has a tendency that side chains produced in the post-translational modification are cut easily. As a result, a modification molecular species and presence/absence of modification can be confirmed from detected ions, but it is difficult to determine the portions where amino acids have been modified.

On the other hand, ECD (Electron Capture Dissociation) is attracting attention as another dissociation means in the field of protein/peptide analysis. Using ECD, one c-z portion on a main chain of amino acid sequence is cut off without depending on the amino acid sequence (provided that any proline residue with a cyclic structure is not cut off exceptionally). As a result, amino acid sequence, a post-translationally modified molecular species, and a modified portion can be analyzed perfectly only by mass spectrometry.

In recent years, a mass spectrometer in which ECD can be performed in an ion trap section has been developed as disclosed in Patent Literature 2. Such an apparatus has been attracting attention because CID measurement and ECD measurement can be performed by one apparatus so as to acquire a large amount of analysis information about biopolymers. Because compatibility to liquid chromatography is good, it is therefore important to perform ECD protein/peptide analysis at a high speed.

In the field of protein/peptide structure analysis, in order to acquire spectra useful for the structure analysis, it is important to detect a large number of fragment ions resulting from the structure with high efficiency and with high sensitivity.

Typically in CID generally used as structure analysis of peptide, only parent ions are dissociated by collision. It is therefore important to dissociate as many parent ions as possible in order to increase the signal intensity of fragment ions. To this end, various methods for adjusting CID time, CID voltage, etc. in real time have been invented and put to practical use. Also in ECD, it is important to dissociate as many parent ions as possible.

CITATION LIST

Patent Literatures

Patent Literature 1: U.S. Pat. No. 4,736,101
Patent Literature 2: JP-A-2006-234782

SUMMARY OF INVENTION

Technical Problem

However, when fragment ions are detected after as many parent ions as possible are dissociated in ECD, there is a problem that the number of peaks of detectable fragment ions may be reduced (see FIG. 6(*b*)).

To solve the foregoing problem, an object of the present invention is to increase the number of peaks of detectable fragment ions.

Solution to Problem

In order to solve the foregoing problem, in a mass spectrometer and mass spectrometry according to the present invention, a reaction time of the electron capture dissociation can be changed in accordance with the magnitude of the charge of ions subjected to mass spectrometry. Here, the mass spectrometry means mass spectrometry performed before electron capture dissociation (MS1) in order to select parent ions on which the electron capture dissociation should be performed.

In ECD reaction, it is important to dissociate as many parent ions as possible. In the past, therefore, a default value (fixed value) with which as many parent ions as possible can be dissociated is used as ECD reaction time. As a result, there are cases where the ECD time may be prolonged. Thus, generated fragment ions also cause ECD reaction so that the fragment ions are dissociated and neutralized to reduce the number of detectable peaks of the fragment ions.

On the other hand, the present inventors paid attention to the fact that the ECD reaction efficiency depends on the charge of parent ions. In the present invention, therefore, the ECD reaction time can be changed in accordance with the charge of ions subjected to mass spectrometry (MS1). Thus, because the reaction time of electron capture dissociation can be changed in accordance with the charge of ions subjected to mass spectrometry (MS1), the ECD reaction efficiency can be made more suitable to the ions. As a result, it is possible to prevent fragment ions from being dissociated or neutralized, and it is possible to increase the number of detectable peaks of the fragment ions after the ECD reaction.

Advantageous Effects of Invention

According to the mass spectrometer and the mass spectrometry of the present invention, it is possible to increase the number of detectable peaks of fragment ions after ECD reaction.

BRIEF DESCRIPTION OF THE DRAWINGS

FIG. 8 is a table showing results of total sums of intensity of fragment ions generated in ECD reaction, which results were calculated in accordance with the reaction times respectively.

DESCRIPTION OF EMBODIMENTS

An embodiment of the invention will be described with reference to the drawings.

[Configuration of Mass Spectrometer]

Figure 1:
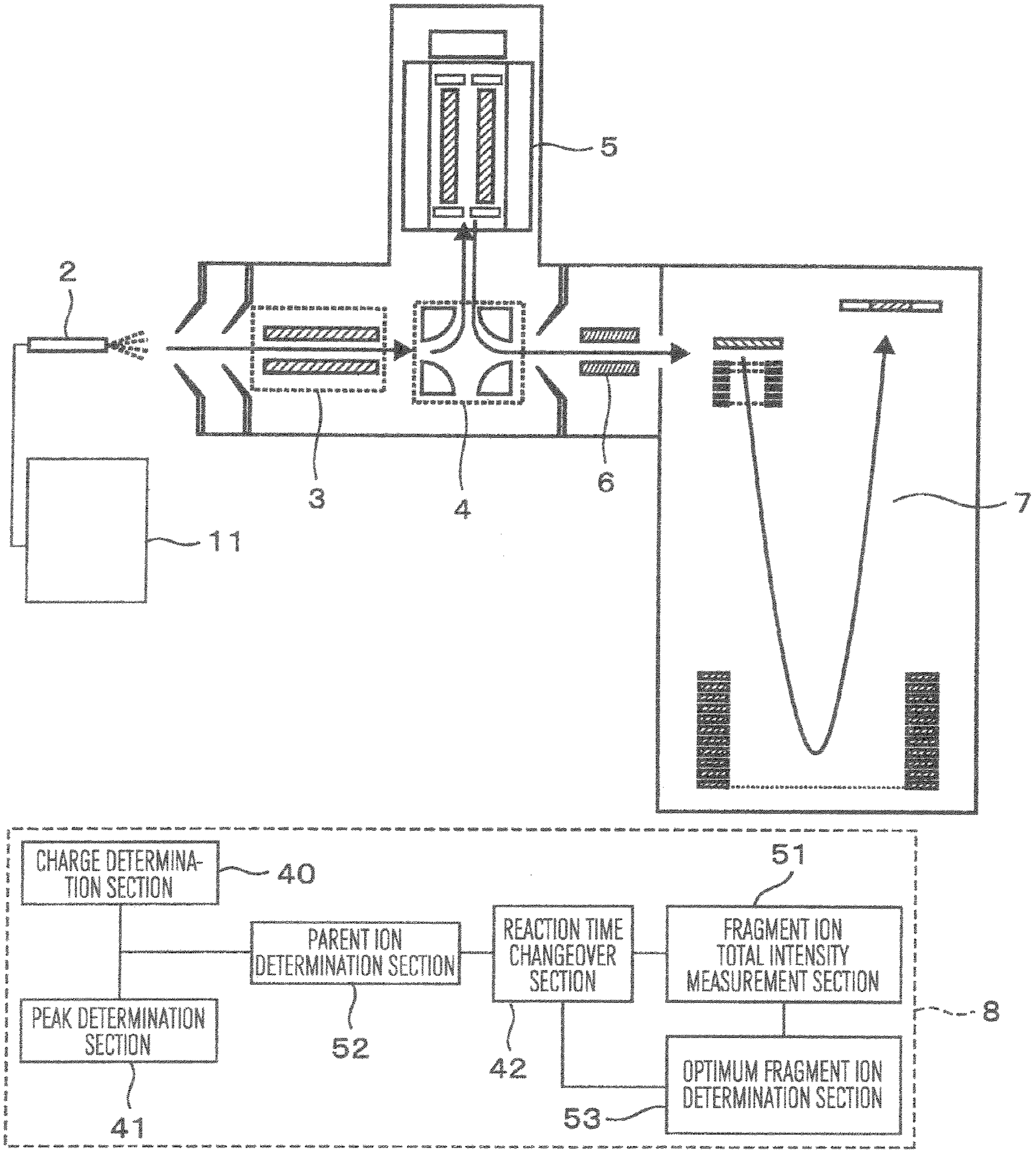
FIG. 1 is a diagram showing a schematic configuration of a mass spectrometer according to the present invention.

FIG. 1 is a schematic diagram showing a mass spectrometer (this apparatus) according to an embodiment of the present invention.

This apparatus has an ion source (ion source section) 2, an ion trap section 3, a deflector lens 4, an ion dissociation section 5, an ion transport section 6, a TOF mass spectrometry section (mass spectrometry section) 7, and a control section 8. For example, a sample is introduced into this apparatus by a liquid chromatograph 11. Components, e.g. peptide components, separated by the liquid chromatograph 11 are guided to the ion source 2.

The ion source 2 ionizes the peptide components. An electro spray ion source (ESI) may be used as the ion source 2. The electro spray ion source generates useful multiply-charged ions of protein/peptide easily.

In order to improve the purity of parent ions, the ion trap section 3 has a function of accumulating ions, a function of isolating and accumulating ions, and so on. For example, a linear trap may be used as the ion trap section 3. As for the isolation and accumulation of ions, isolation and accumulation may be performed concurrently, or accumulation may be performed prior to isolation.

The operation of the deflector lens 4 is changed over in accordance with whether ECD measurement is performed or not. When ECD measurement is performed in the ion dissociation section 5, parent ions, which are determined by a parent ion determination section 52 described later and isolated and accumulated in the ion trap section 3, are introduced into the ion dissociation section 5. When ECD measurement is not performed in the ion dissociation section 5, the ions accumulated in the ion trap section 3 are introduced into the mass spectrometry section 7.

The ion dissociation section 5 dissociates (performs electron capture dissociation on) the parent ions determined by the parent ion determination section 52, so as to form the parent ions into fragment ions. The ion dissociation section 5 is provided with an electron source. A linear trap capable of performing ECD (Electron Capture Dissociation) reaction may be used as the ion dissociation section 5.

The ion transport section 6 transports, to the mass spectrometry section 7, the fragment ions discharged from the ion dissociation section 5 after the ECD reaction, and transports, to the mass spectrometry section 7, the ions accumulated in the ion trap section 3 before mass spectrometry (MS1).

The mass spectrometry section 7 is a TOF (Time Of Flight) type mass spectrometry section 7, which performs mass spectrometry (MS1) for selecting parent ions from the ions accumulated in the ion trap section 3 and high-resolution measurement (mass spectrometry MS2) using the fragment ions subjected to the ECD reaction in the ion dissociation section 5. The mass spectrometry section 7 is not limited to the TOF type mass spectrometry section but may be an FT-ICR. The control section 8 controls the operation of each member including the ion trap section 3 etc.

The control section 8 is provided with a charge determination section 40, a peak determination section 41, a reaction time changeover section 42, and the parent ion determination section 52.

The charge determination section 40 determines whether the charge of a peak is larger than the charge of a peak of a standard sample or not, based on peak information (m/z, intensity, charge, and isotope) of spectral data of the mass spectrometry (MS1). The peak determination section 41 determines whether the peak of the spectral data of the mass spectrometry (MS1) is higher than a predetermined threshold or not. Based on the determination results of the charge determination section 40 and the peak determination section 41, the parent ion determination section 52 determines parent ions. The reaction time changeover section 42 determines reaction time based on the charge of the determined parent ions. The parent ion determination section 52 determines the parent ions based on the spectral data of the mass spectrometry (MS1). This determination is made in accordance with whether the signal intensity of the peak of the spectral data is greater than a predetermined threshold or not. Ions having signal intensity greater than the predetermined threshold are regarded as parent ions, while ions having signal intensity not greater than the predetermined threshold are not regarded as parent ions. When there are a plurality of such parent ions, measurements may be made in order of decreasing signal intensity. The way of the determination will be described in detail later in (1) to (3).

Further, the control section 8 may be provided with a fragment ion total intensity measurement section (total intensity measurement section) 51 and an optimum fragment ion determination section 53. The total intensity measurement section 51 measures a total sum of intensity of fragment ions. The total intensity measurement section 51 obtains a total intensity of fragment ions for each reaction time while changing the reaction time of ECD. As a result, the aforementioned optimum fragment ion determination section 53 selects fragment ions whose total intensity is the greatest. After the selection, the reaction time changeover section 42 changes over the ECD reaction time to a reaction time corresponding to the selected fragment ions.

The total intensity measurement section 51 and the optimum fragment ion determination section 53 are not essential constituent elements. When the total intensity measurement section 51 and the optimum fragment ion determination section 53 are not provided, the reaction time changeover section 42 determines the reaction time based on the charge of the parent ions. When the total intensity measurement section 51 and the optimum fragment ion determination section 53 are provided, the reaction time changeover section 42 determines the reaction time based on the determination result of the optimum fragment ion determination section 53 and the charge of the parent ions.

[Typical Operations of Mass Spectrometer]

Figure 2:
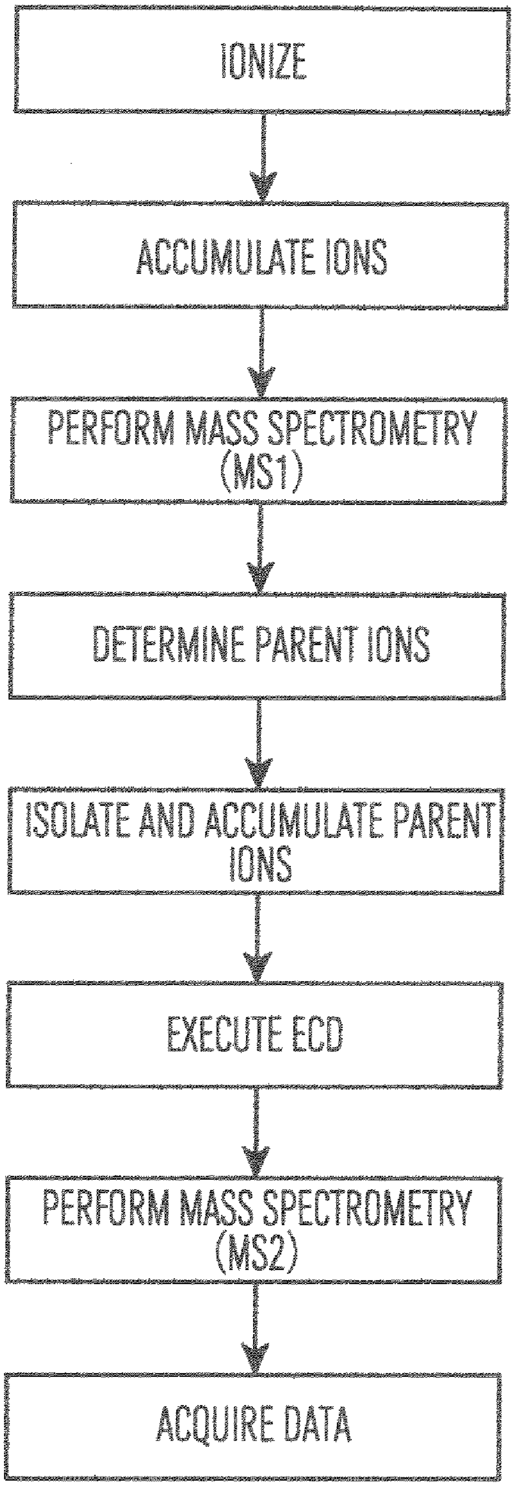
FIG. 2 is a flow chart showing a schematic flow of a general mass spectrometer.

FIG. 2 is a flow chart showing a flow of operations in a typical mass spectrometer.

As shown in FIG. 2, this apparatus performs operations in the following order.

(i) Ionization: the ion source 2 ionizes components obtained from the liquid chromatograph 11.

(ii) Ion accumulation: the ion trap section 3 accumulates the ions ionized by the ion source 2.

(iii) Mass spectrometry (MS1): the mass spectrometry section 7 performs mass spectrometry (MS1) for selecting parent ions from the ions accumulated in the ion trap section 3.

(iv) Parent ion determination: the parent ion determination section 52 determines parent ions based on the charge determination and the peak determination. Here, a plurality of parent ions may be selected and determined as the parent ions. In that case, for example, MS2 may be performed on the parent ions in order of decreasing signal intensity.

(v) Parent ion isolation/accumulation: the ion trap section 3 isolates and accumulates the determined parent ions. That is, the ion trap section 3 selects the determined parent ions.

(vi) ECD (electron capture dissociation) execution: the ion dissociation section 5 dissociates the determined parent ions so as to form the parent ions into fragment ions.

(vii) Mass spectrometry (MS2): mass spectrometry (MS2) is performed on the fragment ions subjected to ECD reaction.

(viii) Data acquisition: data after the mass spectrometry (MS2) are acquired.

[Characteristic Operations of Mass Spectrometer]

Figure 3:
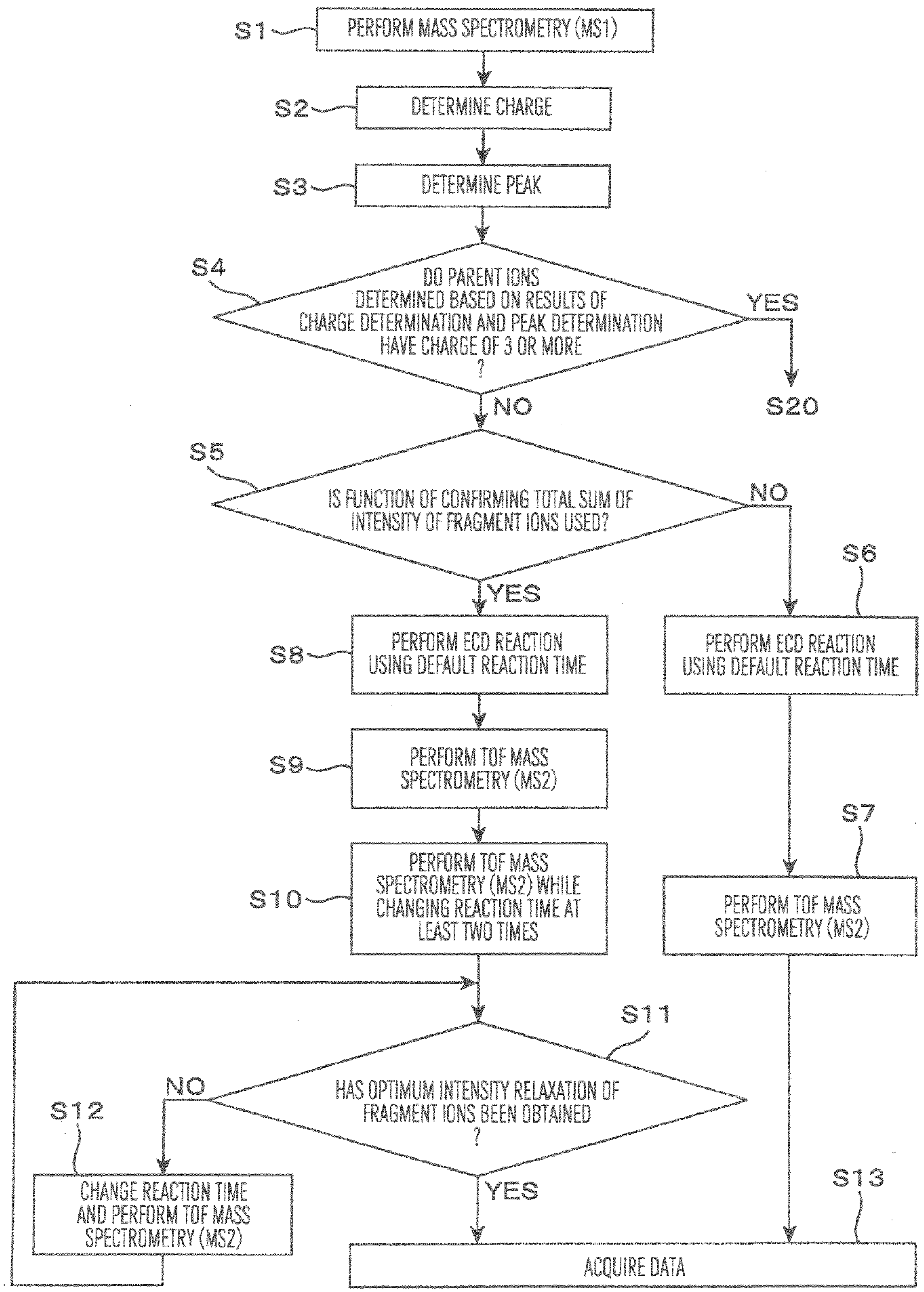
FIG. 3 is a flow chart showing a flow of analysis in the mass spectrometer according to the present invention.
Figure 4:
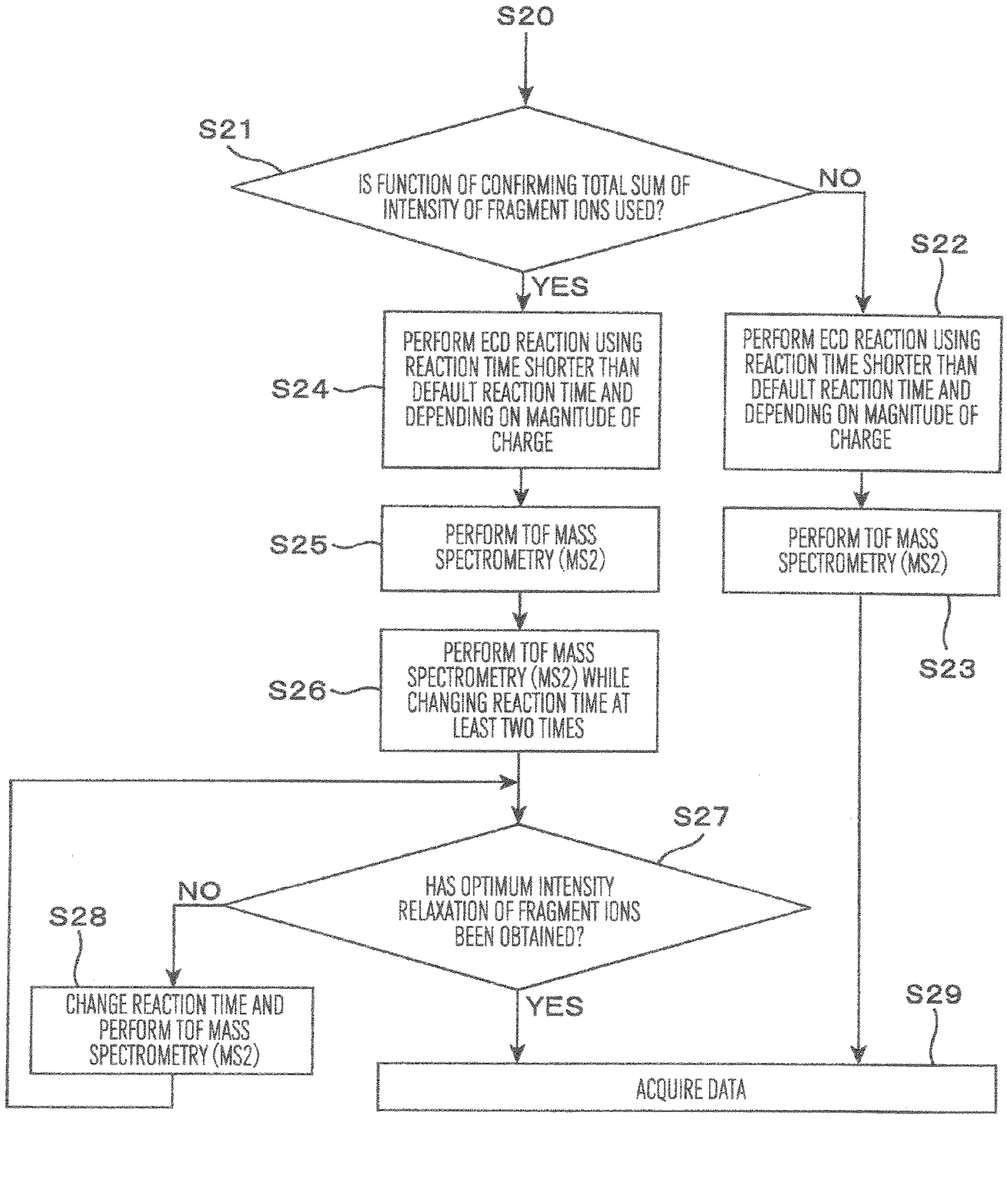
FIG. 4 is a flow chart showing the flow of analysis in the mass spectrometer according to the present invention.

FIGS. 3 and 4 are flow charts for explaining a characteristic flow of operations in this apparatus. Particularly FIG. 4 is a flow chart for explaining the most essential part of this embodiment, i.e. a flow chart for explaining how to determine the ECD reaction time.

First, mass spectrometry (MS1) is performed (S1). Next, the charge determination section 40 determines the charge (S2). Here, though not shown, the flow returns to S1 when there is no ions whose charge is greater than or equal to two. After that, the peak determination section 41 determines the peak of ions (S3). Specifically, the peak determination section 41 determines whether the peak of the ions is greater than a predetermined threshold or not. Although description is made here in order from the charge determination to the peak determination, those determinations may be performed reversely or may be performed concurrently.

Next, the parent ion determination section 52 determines parent ions based on the results of the charge determination (S2) and the peak determination (S3). Thus, since the charge of the parent ions is known, it is determined whether the charge is at least three or not (S4). Here, how to determine the parent ions will be described additionally.

(1) When there is only one ion whose charge is two or more and the signal intensity of the ions is greater than a predetermined threshold, the ion is regarded as a parent ion.

(2) When there are a plurality of ions whose charges are two or more and there is only one ion whose signal intensity is greater than the predetermined threshold, the ion is regarded as a parent ion.

(3) When there are a plurality of ions whose charges are two or more and there are a plurality of ions whose signal intensities are greater than the predetermined threshold, the ion whose signal intensity is the greatest is regarded as a parent ion or a plurality of ions selected in order of decreasing signal intensity are regarded as parent ions.

The following routine will be described on the assumption that one parent ion has been determined. If a plurality of parent ions have been determined, the flow may return to S4 again after mass spectrometry (MS2), so as to perform analysis operation. Further description in this case will be omitted.

When the charge of the parent ions is three or more, the flow advances to a routine shown in FIG. 4. On the other hand, when the ion charge is two, the flow advances to S5.

In S5, the control section 8 determines whether a user uses a function of confirming the total sum of intensity of fragment ions or not. Specifically, for example, the control section 8 asks the user whether the user uses the function or not. Based on an instruction from the user, the control section 8 determines whether to use the function.

When it is concluded in S5 that the function is not used, the reaction time changeover section 42 does not change over the ECD reaction time but sets it as default (prescribed reaction time), and the ion dissociation section 5 performs ECD reaction on the determined parent ions (S6). Next, the mass spectrometry section 7 performs TOF mass spectrometry (MS2) (S7). After the TOF mass spectrometry (MS2), the control section 8 acquires data (S13).

On the other hand, when it is concluded in S5 that the function is used, the reaction time changeover section 42 does not change over the ECD reaction time but sets it as default, and the ion dissociation section 5 performs ECD reaction on the parent ions (S8). Next, the mass spectrometry section 7 performs TOF mass spectrometry (MS2) (S9). After that, the ECD reaction time is changed at least two times, and mass spectrometry (MS2) is performed for each reaction time (S10). Next, the optimum fragment ion determination section 53 determines whether a reaction time causing optimum total intensity of fragment ions is included in the at least three reaction times or not (S11). When YES in S11, the reaction time in this case is selected and data are acquired (S13). When NO in S11, the reaction time is changed over again (S12), and the flow returns to S11.

Next, the case of YES in S4 (S20) will be described with reference to FIG. 4. When YES in S4, that is, when the charge of the determined parent ions is three or more, the control section 8 determines whether the user uses the function of confirming the total intensity of fragment ions or not (S21).

When it is concluded in S21 that the function is not used, the reaction time changeover section 42 changes over the ECD reaction time to be shorter than the default reaction time and depending on the magnitude of the charge, and the ion dissociation section 5 performs ECD reaction on the determined parent ions (S22). Next, the mass spectrometry section 7 performs TOF mass spectrometry (MS2) (S23). After the TOF mass spectrometry (MS2), the control section 8 acquires data (S29).

On the other hand, when it is concluded in S21 that the function is used, the reaction time changeover section 42 changes over the ECD reaction time to be shorter than the default reaction time depending on the magnitude of the charge, and the ion dissociation section 5 performs ECD reaction on the parent ions (S24). Next, the mass spectrometry section 7 performs TOF mass spectrometry (MS2) (S25). After that, the ECD reaction time is changed at least two times, and mass spectrometry (MS2) is performed for each reaction time (S26). Next, the optimum fragment ion determination section 53 determines whether a reaction time causing optimum total intensity of fragment ions is included in the at least three reaction times or not (S27). When YES in S27, the reaction time in this case is selected and data are acquired (S29). When NO in S27, the reaction time is changed over again (S28), and the flow returns to S27.

[Experimental Data]

Figure 5:
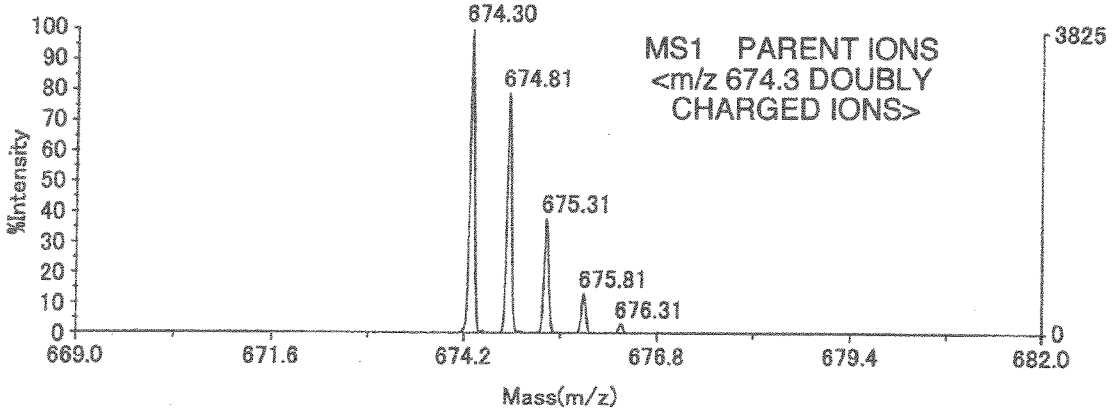
FIG. 5(*a*) is a graph showing MS spectra in the case where mass spectrometry (MS1) was performed using a standard sample, and (b) is a graph showing spectra of ECD fragment ions in the case where mass spectrometry (MS2) was performed using the standard sample.
Figure 5:
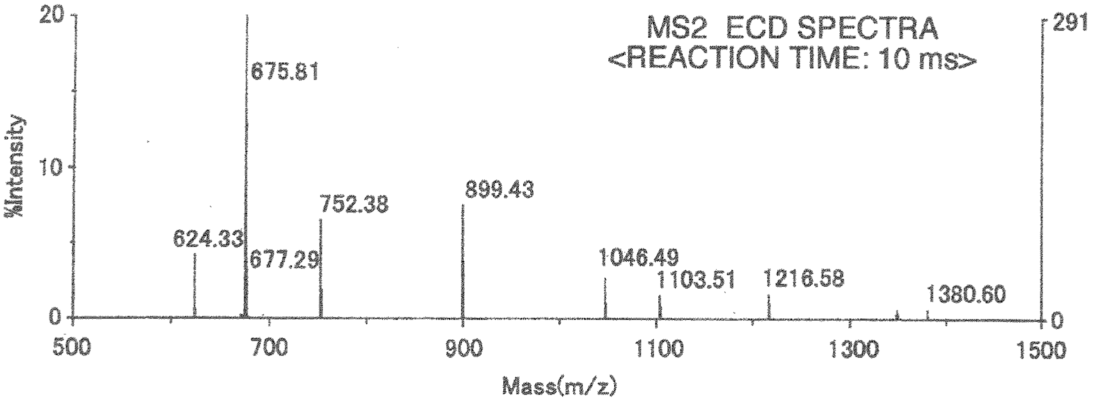
Figure 6:
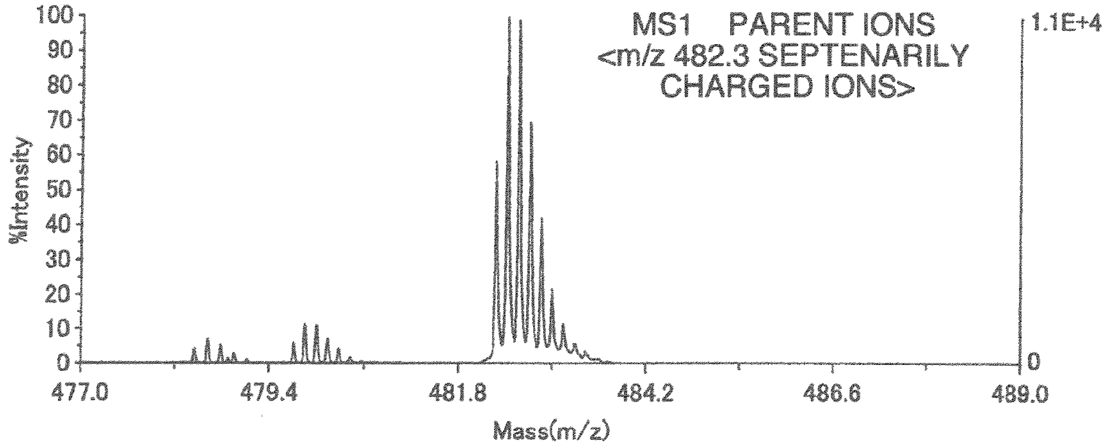
FIG. 6(*a*) is a graph showing MS1 spectra in the case where ghrelin was measured, and (b) is a graph showing spectra of ECD fragment ions in the case where ECD reaction time was set at 10 ms.
Figure 6:
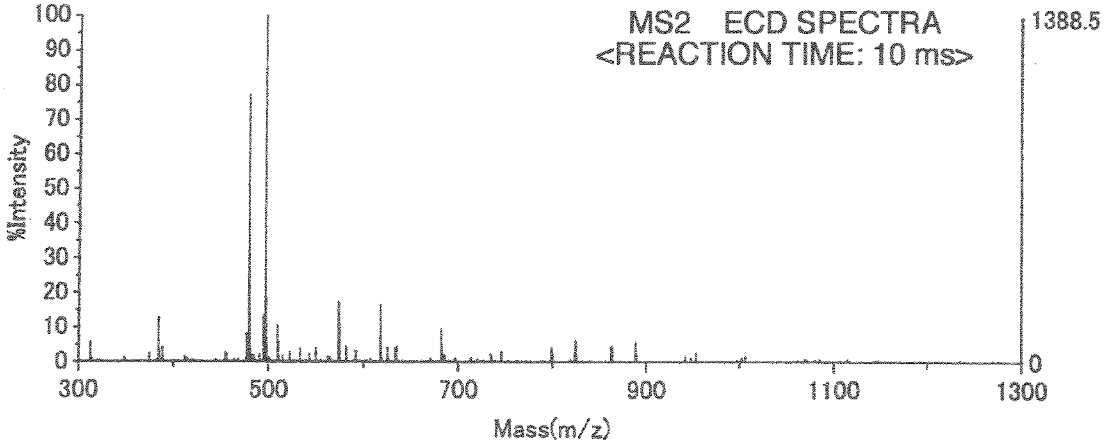
Figure 7:
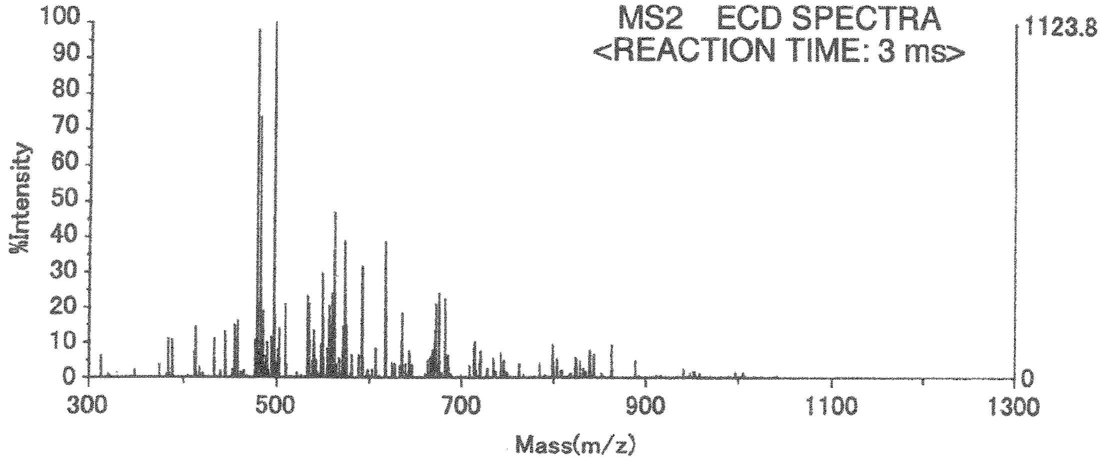
FIG. 7(*a*) is a graph corresponding to FIG. 6 and showing spectra of ECD fragment ions in the case where ECD reaction time was set at 3 ms, and (b) is a graph likewise showing spectra of ECD fragment ions in the case where ECD reaction time was set at 5 ms.
Figure 7:
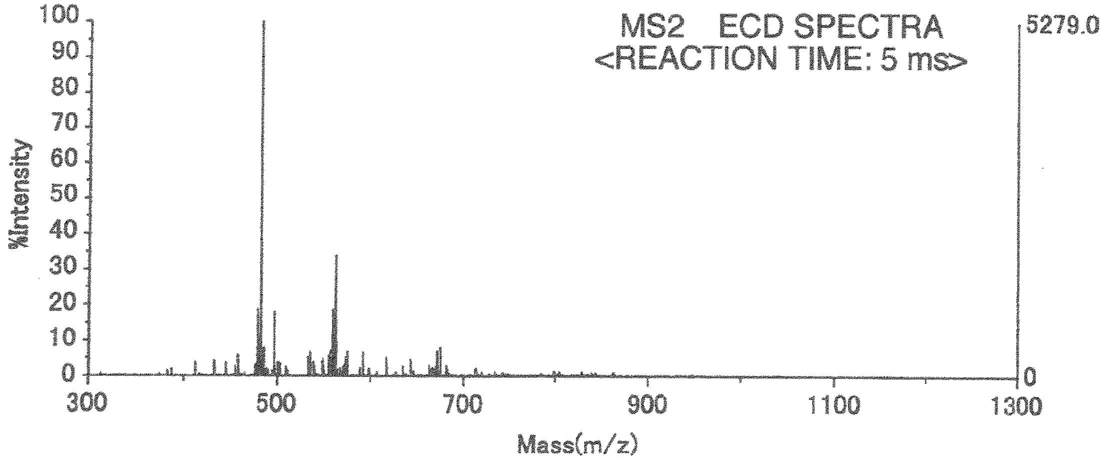

Next, the effect of this embodiment will be described using actual data with reference to FIGS. 5 to 8. FIGS. 7 and 8 are graphs showing the effect of the embodiment, and FIGS. 5 and 6 are graphs for conducing to the effect. FIG. 5(*a*) shows MS1 spectra in which Substance-P (amino acid sequence: RPKPQQFFGLM) used as an ECD adjusting sample ("known standard sample" stated in Claims) was measured. FIG. 5(*b*) shows spectra of ECD fragment ions based on MS2 (MS2 spectra) in which Substance-P (amino acid sequence: RPKPQQFFGLM) used likewise as an ECD adjusting sample was measured.

In FIGS. 5(*a*) and (*b*), the abscissa designates m/z, and the ordinate designates signal intensity. Parent ions detected in MS1 are doubly charged ions, and the reaction time with which the total signal intensity of fragment ions using the peak of the doubly charged ions is the highest is 10 ms. The ECD reaction time 10 ms determined by Substance-P is set as a default value ("prescribed reaction time" stated in Claims), and another peptide component is measured. Here, for example, ghrelin (amino acid sequence: GSS (-n-Octanoyl) FLSPEHGRVQQRKESKKPPAKLQPR) is used as the peptide component.

FIG. 6(*a*) shows MS1 spectra in which ghrelin was measured. FIG. 6(*b*) shows spectra of ECD fragment ions (MS2 spectra), in which ghrelin was measured likewise for an ECD reaction time of 10 ms in MS2. Of parent ions derived from ghrelin in FIG. 6(*a*), ions whose signal intensity peak is the highest are septenarily charged ions with m/z of 482. The septenarily charged ions were selected as parent ions, and ECD reaction was performed for an ECD reaction time of 10 ms. In fragment ions obtained as a result of the ECD reaction, the number of spectra for the fragment ions was small as compared with the number of amino acid residues, as shown in FIG. 6(*b*). The present inventors judged that the most suitable ECD reaction time must be set to be lower in ghrelin whose parent ions have a charge of seven than in Substance-P whose parent ions have a charge of two.

FIGS. 7(*a*) and (*b*) are graphs showing ECD spectra of ECD fragment ions when the ECD reaction time in ECD measurement of ghrelin, which was set at 10 ms in FIG. 6(*b*), was changed to 5 ms and 3 ms, respectively. As compared with the ECD reaction time of 10 ms shown in FIG. 6(*b*), it can be confirmed that the number of spectra of fragment ions (the number of peaks of fragment ions) increased at 5 ms shown in FIG. 7(*b*). In addition, in the ECD reaction time of 3 ms, the peak intensity ratio of parent ions increased as shown in FIG. 7(*a*). From this fact, it can be judged that the ECD reaction efficiency in the peak of the selected parent ions was reduced. Also from this fact, ECD fragment ions acquired in the ECD reaction time of 5 ms are useful for structural analysis of amino acid sequence.

FIG. 8 shows results in which the total of fragment ions generated by ECD reaction was calculated for each reaction time. In FIG. 8, the total signal intensity of fragment ions is for each charge in each of C and Z series of C-Z series cut off by the ECD reaction. From the total of the fragment ions for each reaction time, the maximum intensity value was obtained at 5 ms. This result is similar to the result of maximum value of the number of detection of fragment ions in the spectra of the fragment ions shown in FIG. 7(*b*) and the result of reaction efficiency of parent ions.

When the ECD reaction time was 10 ms, generated fragment ions also produced ECD reaction due to the long ECD time (electron irradiation time) so that the fragment ions were dissociated and neutralized. Thus, both the total signal intensity of the fragment ions and the number of peaks thereof are small. From this fact, when the reduction of ECD reaction time and the total sum of reaction time generated by ECD are checked in accordance with the increase of the charge of parent ions, the ECD reaction time can be optimized for various parent ions separated by liquid chromatography and ionized. It is therefore possible to acquire a large amount of information useful for analyzing the amino acid sequence of protein/peptide.

[Additional Statement]

In a mass spectrometer which has an ion trap section and which is capable of performing ECD, first in execution of ECD, the charge of parent ions is determined when parent ions on which ECD reaction should be carried out are determined from mass spectra, and ECD reaction time during the execution of ECD is changed in accordance with different charges of parent ions. In addition to the charge, the total signal intensity of fragment ions generated after the execution of ECD is determined. The ECD reaction time with which the total signal intensity of the fragment ions will be the greatest is set to solve the problem.

According to the present invention, the ECD reaction time is changed in accordance with parent ions having different charges, so that ECD fragment ions can be prevented from being dissociated or neutralized due to excessive ECD reaction time. Thus, the signal intensity of the ECD fragment ions can be increased. In addition, it is possible to obtain mass spectrometry and a mass spectrometer in which ECD reaction time can be optimized while the total signal intensity of fragment ions generated by ECD is confirmed, so that useful ECD spectra can be obtained at a high speed.

The present invention is a control method using mass spectrometry provided with electron capture dissociation and relates to a technique for analyzing a structure of biopolymer sequence.

On the other hand, also in ECD, it is important to dissociate as many parent ions as possible. However, when ECD time (electron irradiation time) is prolonged to dissociate more parent ions, generated fragment ions also cause ECD reaction so that the fragment ions are dissociated and neutralized. It is therefore important to control the ECD time. In addition, the efficiency in ECD reaction often depends on the charge of parent ions, amino acid sequence, and so on. In conjunction with liquid chromatography, it is therefore important to adjust the ECD reaction time in accordance with information about the parent ions and to obtain ECD spectra at a high speed.

To solve the foregoing problem, an object of the present invention is to implement mass spectrometry and a mass spectrometer in which the reaction efficiency of ECD fragment ions is optimized and the signal intensity of the fragment ions is increased in conjunction with liquid chromatography, so that ECD spectra useful in conjunction with the liquid chromatography can be obtained at a high speed.

Alternatively, the present invention may be expressed as follows.

A control method of a mass spectrometer including an ion source section which generates ions from a sample, an ion trap section which accumulates, isolates, dissociates, and discharges the ions generated in the ion generating section by a two-dimensional high-frequency ion trap comprising a two-dimensional high-frequency electric field and an electrostatic field, an ion dissociation section which irradiates an electron beam to thereby perform electron capture dissociation on the ions discharged from the ion trap section in a reaction cell which is provided with a two-dimensional combined ion trap for applying a magnetic field and an electron source for generating the electron beam, and a mass spectrometry section which performs mass spectrometry on the ions discharged from the ion dissociation section, the control method of the mass spectrometer being characterized in that: a control section which controls isolation of the intended ions subjected to the electron capture dissociation and electron capture dissociation in the ion trap section is provided so that the efficiency in dissociation of the intended ions in the ion dissociation section can be improved in accordance with the intended ions subjected to the electron capture dissociation in the ion trap section.

A control method of the mass spectrometer characterized in that: intended ions having different charges are determined and selected by the control section when the intended ions are isolated in the ion trap section; and the dissociation reaction time in the ion dissociation section for executing the electron capture dissociation is shortened with increase in the charge of the isolated intended ions.

A control method of the mass spectrometer characterized in that: the dissociation reaction time in the ion dissociation section for executing the electron capture dissociation is changed in the control section automatically in accordance with the charge of the isolated intended ions when the intended ions are isolated in the ion trap section and intended ions having different charges are determined and selected by the control section.

A control method of the mass spectrometer characterized in that: when intended ions are isolated in the ion trap section, the intended ions having different charges are determined and selected by the control section; and when the isolated intended ions are dissociated in the dissociation section for executing the electron capture dissociation, the total signal intensity of dissociated ions is determined by the control section so that the dissociation reaction time is controlled automatically to increase the total signal intensity of the dissociated ions.

INDUSTRIAL APPLICABILITY

The mass spectrometer according to the present invention may be used together with a liquid chromatography.

REFERENCE SIGNS LIST

2 ion source (ion source section)
3 ion trap section
5 ion dissociation section
7 time-of-flight mass spectrometry section (mass spectrometry section)
40 charge determination section
41 peak determination section
42 reaction time changeover section
51 fragment ion total intensity measurement section (total intensity measurement section)

The invention claimed is:

1. A mass spectrometer comprising:

an ion source section which generates ions from a sample;

an ion trap section which accumulates and selects the ions;

an ion dissociation section which performs electron capture dissociation on the ions; and a mass spectrometry section which performs mass spectrometry on the ions;

the mass spectrometer being characterized in that: a reaction time of the electron capture dissociation can be changed in accordance with a charge of the ions subjected to the mass spectrometry.

2. The mass spectrometer according to claim 1, characterized in that: the reaction time of the electron capture dissociation for the ions subjected to the mass spectrometry is shorter than a reaction time prescribed using a known standard sample when a peak of the ions is higher than a predetermined threshold and a charge of the ions is larger than two.

3. The mass spectrometer according to claim 1, characterized in that: a total sum of intensity of fragment ions subjected to the mass spectrometry after the electron capture dissociation is obtained in accordance with each different reaction time.

4. A mass spectrometer comprising:

an ion source section which generates ions from a sample;

an ion trap section which accumulates and selects the ions;

an ion dissociation section which performs electron capture dissociation on the ions;

a mass spectrometry section which performs mass spectrometry on the ions;

a charge determination section which determines whether a charge of the ions subjected to the mass spectrometry is larger than a predetermined charge or not;

a peak determination section which determines whether a peak of the ions subjected to the mass spectrometry is higher than a predetermined threshold or not; and a reaction time changeover section which changes over a reaction time of the electron capture dissociation for the ions, whose charge is larger than the predetermined charge, based on a determination result of the charge determination section.

5. The mass spectrometer according to claim 4, characterized in that: the reaction time changeover section makes the reaction time of the electron capture dissociation for the ions, whose peak is higher than the predetermined threshold and whose charge is larger than two, shorter than a reaction time prescribed using a known standard sample.

6. The mass spectrometer according to claim 4, characterized by further comprising:

a total intensity measurement section which measures a total sum of intensity of fragment ions subjected to the mass spectrometry after the electron capture dissociation in accordance with each different reaction time.

7. Mass spectrometry using a mass spectrometer including an ion source section which generates ions from a sample, an ion trap section which accumulates the ions, an ion dissociation section which performs electron capture dissociation on the ions, and a mass spectrometry section which performs mass spectrometry on the ions, the mass spectrometry being characterized in that:

a reaction time of the electron capture dissociation can be changed in accordance with a charge of the ions subjected to the mass spectrometry.

8. Mass spectrometry using a mass spectrometer including an ion source section which generates ions from a sample, an ion trap section which accumulates the ions, an ion dissociation section which performs electron capture dissociation on the ions, and a mass spectrometry section which performs mass spectrometry on the ions, the mass spectrometry being characterized by comprising:

a charge determination step of determining whether a charge of the ions subjected to the mass spectrometry is larger than a predetermined charge or not;

a peak determination step of determining whether a peak of the ions subjected to the mass spectrometry is higher than a predetermined threshold or not; and a step of changing over a reaction time of the electron capture dissociation for the ions, whose charge is larger than the predetermined charge, based on a determination result of the charge determination step.

* * * * *